United States Patent
Lee et al.

(10) Patent No.: US 6,965,576 B1
(45) Date of Patent: Nov. 15, 2005

(54) AUTOMATIC CONFIGURATION OF WLAN FOR MOBILE USERS

(75) Inventors: Chiao-Wei Lee, Union, NJ (US); Yibei Ling, Belle Mead, NJ (US); Wai Chen, Parsippany, NJ (US); Onur Altintas, Florham Park, NJ (US); Yoshihisa Suwa, Nagoya (JP)

(73) Assignees: Telcordia Technologies, Inc., Piscataway, NJ (US); Toyota Motor Corporation, Aichi-ken (JP)

( * ) Notice: Subject to any disclaimer, the term of this patent is extended or adjusted under 35 U.S.C. 154(b) by 0 days.

(21) Appl. No.: 10/828,961

(22) Filed: Apr. 21, 2004

(51) Int. Cl.[7] .......................... H04L 12/28; H04Q 7/20; G06F 15/16
(52) U.S. Cl. .................. 370/254; 370/338; 455/414.2; 709/220; 709/224
(58) Field of Search ................................ 370/254, 328, 370/338, 401, 465; 455/412.1, 414.1, 414.2, 455/456.1; 709/220, 223, 224, 227

(56) References Cited

U.S. PATENT DOCUMENTS

| | | | |
|---|---|---|---|
| 2003/0081567 A1 * | 5/2003 | Okanoue et al. | 370/328 |
| 2003/0217122 A1 * | 11/2003 | Roese et al. | 709/219 |
| 2003/0225893 A1 * | 12/2003 | Roese et al. | 709/227 |
| 2004/0092271 A1 * | 5/2004 | Viikari et al. | 455/456.2 |
| 2004/0103204 A1 * | 5/2004 | Yegin | 709/229 |
| 2004/0107219 A1 * | 6/2004 | Rosenberger | 707/104.1 |
| 2004/0109429 A1 * | 6/2004 | Carter et al. | 370/338 |
| 2004/0120323 A1 * | 6/2004 | Viikari et al. | 370/395.5 |
| 2004/0157624 A1 * | 8/2004 | Hrastar | 455/456.1 |
| 2004/0170154 A1 * | 9/2004 | Carter et al. | 370/338 |
| 2004/0210654 A1 * | 10/2004 | Hrastar | 709/224 |
| 2005/0004968 A1 * | 1/2005 | Mononen et al. | 709/200 |

* cited by examiner

*Primary Examiner*—Alpus H. Hsu
(74) *Attorney, Agent, or Firm*—Joseph Giordano; David A. Hey

(57) ABSTRACT

The present invention provides a system and method for automatically configuring a mobile host in a Wireless Local Access Network (WLAN) environment. In particular, the present invention employs GPS technology and an Information Gateway to provide preconfigured information about different access points of the WLAN within the vicinity of the current location of the mobile host.

9 Claims, 3 Drawing Sheets

AUTOMATIC CONFIGURATION OF WLAN FOR MOBILE USERS

FIELD OF THE INVENTION

The present invention provides a system and method for automatically configuring a mobile host in a Wireless Locale Area Network (WLAN). In particular, the present invention employs GPS technology and an Information Gateway (IGW) to provide preconfigured information about different access points of the WLAN within the vicinity of the current location of the mobile host.

BACKGROUND

Wireless Local Area Network (Wireless LAN hereafter) is emerging as a highly-demanded and fast-deployed technology. With its relative high-throughput capability and lower deployment cost (no spectrum license fee required), wireless LAN has been considered as a complimentary technology with 3G mobile wireless network to provide seamless data service coverage. IEEE 802.11b operating at 11 Mb/s is the most widely-deployed technology among the wireless LAN technology family and has been adopted widely in academic and enterprise environments. Commercial service based on 802.11b is also available in major airports, train stations, hotels, malls, and coffee shops around the world. IEEE 802.11a operating in the 5 GHz spectrum and IEEE 802.11g operating in the 2.4 GHz spectrum, the high throughput versions of IEEE 802.11 family, are gradually being deployed to offer even better data throughput. Supporting wireless LAN connectivity has been considered as a mandatory feature for new end user mobile devices, particularly PDA and laptops. New technologies for such devices currently support 802.11b and will support 802.11a and 802.11g in the near future, to boost the demand of wireless connectivity, as well as equipment upgrades. Most new laptops are equipped with wireless LAN connectivity and the demand continues to grow. It has been reported that wireless access points may become as ubiquitous as telephone jacks. (Steve Weinstein, The Mobile Internet: Wireless LAN vs. 3G Cellular Mobile, IEEE Communications, February, 2002).

A significant problem with the use of WLAN by mobile users is that WLAN was originally designed for local area environments with simple password-backed encryption protection of over-the-air transmission. Therefore, in order to access a WLAN, the mobile device must be pre-configured manually with network profiles that contain mandatory access information, such as Network name or ESSID, and password. For mobile users connected to a geographically distributed network consisting of thousands of access points, the need to manually re-configure upon handoff from one access point to another, imposes a major impediment.

There remains a need in the art for improvements in configuration for mobile users in WLAN environments.

SUMMARY

The present invention provides a system and method for automatically configuring a mobile host in a WLAN. In particular, the present invention employs GPS technology and an IGW to provide preconfigured information about different access points of the WLAN within the vicinity of the current location of the mobile host.

DETAILED DESCRIPTION OF THE DRAWINGS

Figure 1:
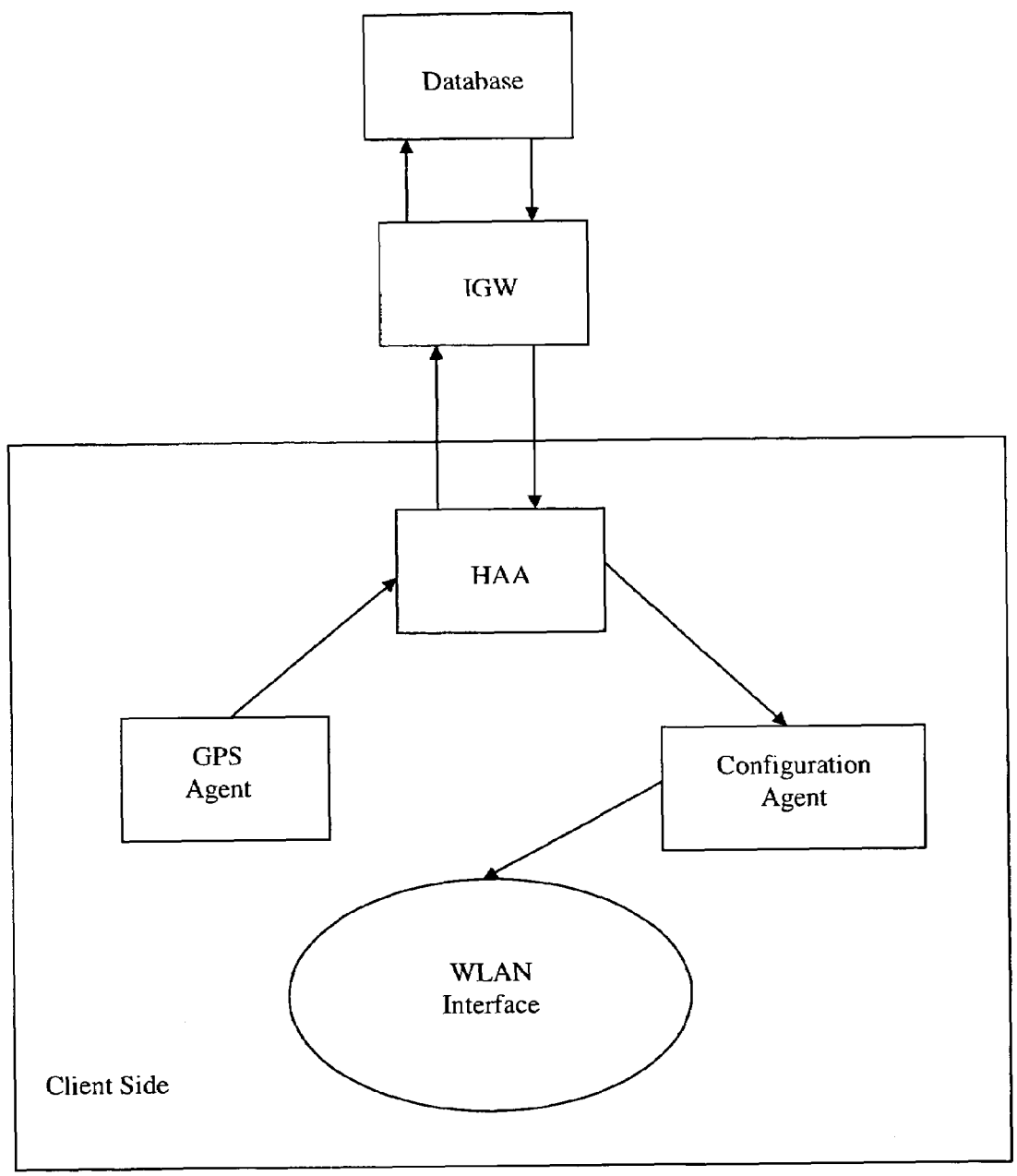
FIG. 1 is a schematic view of the system according to one embodiment of the present invention.

As shown in FIG. 1, the system according to one embodiment of the present invention comprises a configuration agent, a heterogeneous access agent (HAA), a GPS agent and a WLAN interface on the client side or mobile host. On the network side, the system according to the present invention includes an information gateway (IGW), and a database.

The IGW is connected to the HAA through any available network connectivity, and is controlled by the service provider wishing to offer automatic configuration services. The IGW can be deployed either remotely or locally within the network. The IGW communicates with or includes a database that stores and manages network profiles of access points in the WLAN, including location information. Upon a mobile host request, the IGW will retrieve specific network profiles for access points that are in the vicinity of the mobile host current location.

The GPS agent keeps track of the mobile host current location and provides this information to the HAA. The HAA is responsible for communicating with the IGW, including providing current location information received from the GPS agent. The WLAN interface provides the wireless connection between the mobile host and the selected access point (server) within the WLAN. The configuration agent is responsible for automatic configuration of the WLAN interface on the mobile host.

Figure 2:
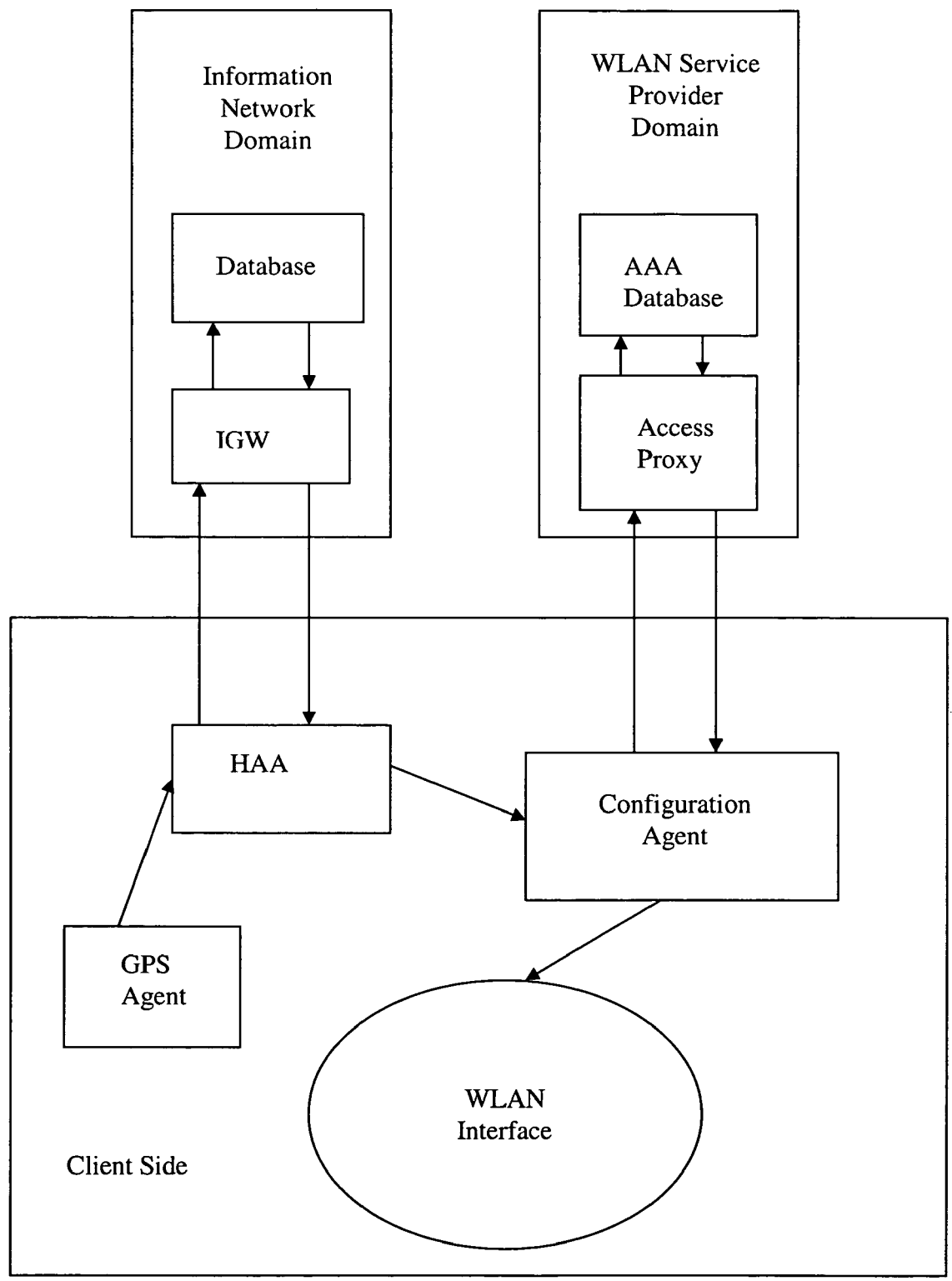
FIG. 2 is a schematic view of the system according to another embodiment of the present invention.

As shown in FIG. 2, the system according to another embodiment of the present invention includes a WLAN service provider domain, having an access proxy and AAA (authentication, authorization and accounting) database. The access proxy is a server responsible for the AAA process, such as user identification authentication and privilege authorization, usually performed following a successful WLAN association carried out through the IGW. In operation, the configuration agent manages the additional authentication and authorization process, by communicating with the access proxy. In particular, the HAA forwards valid access information, such as user name and password, to the configuration agent, which in turn sends a request to authentication and authorization to the access proxy. The access proxy checks the user name and password against entries in the AAA database, which is maintained by the service provider. If the user name and password are found to be valid, then the access proxy notifies the configuration agent and the connect request is granted. However, if the user name or password are invalid, then the access proxy notifies the configuration agent and the connect request is denied. Therefore, even in the event the WLAN association succeeds through the IGW, the mobile host will not be able to gain internet access.

The present invention also provides a method for automatic configuration of a mobile host in a WLAN environment. In particular, the method of the present invention operates as follows. Initially, the mobile host connects to any available network, wireless or otherwise, using normal boot up operations with pre-installed network profiles. As part of this process, the mobile host also begins to communicate with the IGW via the HAA. The GPS agent receives a GPS signal and transmits the current location of the mobile host to the IGW via the HAA in a periodic or adaptive fashion. The IGW receives the location information and compares the location to access point information stored in the database. The IGW then returns network profile information for access points that are close to the mobile host's current geographical location to the HAA. The HAA forwards the received network profiles to the configuration agent that uses the network profiles to automatically configure the WLAN interface. This process can be carried out in a continuous fashion so that the configuration Agent can always have the most current configurations available. In particular, as new location information is transmitted from the HAA to the IGW, the configuration agent can automatically create new network profiles, update existing profiles, and delete any expired profiles.

Once the configuration process is performed, the mobile host can access any one of the access points of the WLANs that are in vicinity of its current location. In this way, delays associated with reconfiguration are avoided. Further, this process is completely transparent to the mobile user, and is automatic, freeing the mobile user from the need to reconfigure manually.

Figure 3:
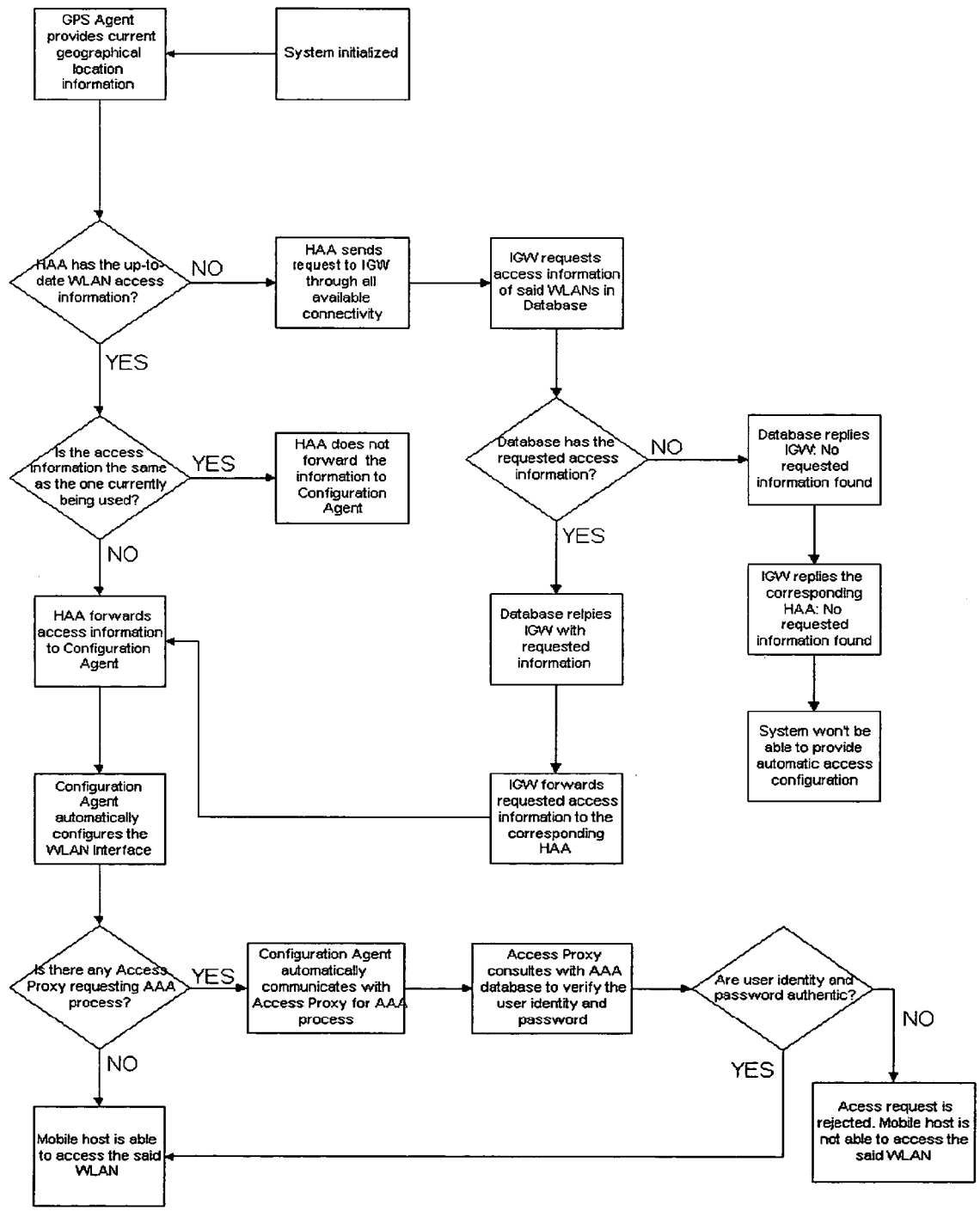
FIG. 3 is a state diagram of one embodiment of the method according to the present invention.

FIG. 3 is a state diagram showing one embodiment of the method according to the present invention. In particular, upon system initialization, the GPS agent provides current geographical location information to the HAA. The HAA then determines if it has the up-to-date WLAN access information. If yes, then the HAA determines if the access information is the same as that currently being used. If yes, the HAA does not need to forward any information to the configuration agent, as no change is needed. However, if the HAA access information is not the same as that currently being used, then the HAA forwards the access information to the configuration agent, the configuration agent automatically configures the WLAN interface. The system then determines if an AAA process is necessary. If no AAA process is requested, then the mobile host is able to access the configured WLAN. However, if an AAA process is requested, the configuration agent communicates with the access proxy to carry out the AAA process. The access proxy checks the AAA database to verify user identity and password. If the user identity and password are valid, then the mobile host is allowed to access the WLAN. However, if user identity or password are not valid then the access request is denied and the mobile host is not able to access the WLAN.

If the HAA initially determines that it does not have the up-to-date WLAN access information, then the HAA sends a request to the IGW and the IGW requests access information for WLANs in the database. If the database has the requested access information, the requested information is provided to the IGW which then forwards the access information to the HAA. In the event the database does not have the requested access information, it replies to the IGW that the requested information was not found and the IGW replies to the HAA. In this case the system will not be able to provide automatic access configuration.

The present invention provides a system and method to support automatic WLAN configuration for mobile hosts. The system and method of the present invention focus on applicability, scalability, manageability and flexibility, and have the ability to automatically configure network profiles to access points in the vicinity of the mobile host current location, without the need for human intervention.

The system and method of the present invention are advantageous in several respects, including being applicable to technologies of the IEEE 802.11 family; providing intelligent management by keeping only relevant network profiles according to the current location of the mobile host; and being scalable and flexible by storing both network profiles and GPS information in databases managed by the IGW that allows dynamic deletion and insertion without modification of the mobile host.

It is anticipated that other embodiments and variations of the present invention will become readily apparent to the skilled artisan in the light of the foregoing specification. Such embodiments and variations are intended to likewise be included within the scope of the invention as set out in the appended claims.

What is claimed is:

1. A system for providing automatic configuration of a mobile host in a wireless local access network (WLAN) environment including a plurality of access points, said system comprising:
    a WLAN interface for connecting said mobile host to one of said access points;
    a database for storing network profiles of said access points;
    a configuration agent for automatically configuring said WLAN interface using said network profiles;
    a GPS agent for keeping track of the current geographic location of the mobile host;
    an information gateway communicating with GPS agent, said database and said configuration agent to provide said network profiles from said database of said access points close to said current geographic location of said mobile host to said configuration agent; and
    a heterogeneous access agent providing communication means between said information gateway, said GPS agent and said configuration agent.

2. The system according to claim 1, wherein configuration agent automatically updates configuration of the WLAN interface based on changes to the current geographic location of said mobile host.

3. The system according to claim 2, wherein said automatic update includes creating new network profiles, updating existing profiles, and deleting expired profiles.

4. A method for providing automatic configuration of a mobile host in a wireless local access network (WLAN) environment having a plurality of access points, said method comprising:
    establishing a database;
    establishing said mobile host to include a WLAN interface, a configuration agent, a GPS agent; and a heterogeneous access agent;
    establishing an information gateway communicating with said database and said heterogeneous access agent;
    storing network profiles of said access points in said database;
    establishing a connection between said mobile host and one of said access points through said WLAN interface;
    establishing a connection between said mobile host and said information gateway through said heterogeneous access agent;
    collecting information on the current geographic location of said mobile host using said GPS agent;
    transmitting said current geographic location information to said information gateway through said heterogeneous access agent;

comparing said current geographic location information to said network profiles stored in said database;

gathering network profiles for access points that are close to said current geographic location on said information gateway;

sending said gathered network profiles from said information gateway to said configuration agent through said heterogeneous access agent; and automatically configuring said WLAN interface based on said gathered network profiles.

5. The method according to claim 4, further including the step of automatically updating said configuration of said WLAN interface based on changes to the current geographic location of said mobile host.

6. The method according to claim 5, wherein said step of automatically updating includes creating new network profiles, updating existing profiles, and deleting expired profiles.

7. The method of claim 4, wherein said step of transmitting said current geographic location information is performed periodically.

8. The method of claim 4, wherein said step of transmitting said current geographic location information is performed adaptively.

9. The method of claim 4, further including the step of performing an AAA process.

* * * * *